Sept. 5, 1967  J. M. SHERFEY  3,340,099

BONDED ELASTOMERIC SEAL FOR ELECTROCHEMICAL CELLS

Filed Jan. 15, 1965

INVENTOR
Joseph M. Sherfey

BY *J Wm McCoy*
*Leonard Ray*
ATTORNEYS

United States Patent Office 3,340,099
Patented Sept. 5, 1967

3,340,099
BONDED ELASTOMERIC SEAL FOR
ELECTROCHEMICAL CELLS
Joseph M. Sherfey, Lanham, Md., assignor to the United
States of America as represented by the Administrator
of the National Aeronautics and Space Administration
Filed Jan. 15, 1965, Ser. No. 425,972
5 Claims. (Cl. 136—133)

The invention described herein may be manufactured and used by or for the Government of the United States of America for governmental purposes without the payment of any royalties thereon or therefor.

This invention relates to an improved seal for electrochemical cells and more particularly to a bonded elastomer-to-metal seal for secondary cells which contain strongly alkaline electrolytes and which require an insulating seal effective against high internal cell pressure.

Batteries, and in particular secondary cells, are used as power sources in many satellite applications and the continued success of these applications depends to some degree upon the effectiveness of the seal between the various terminals and the case of such a cell. Since these cells contain strongly alkaline electrolytes and are subject to extreme environmental changes (for example, both pressure and temperature fluctuations), the insulating seal for the positive and negative terminals should be resistive to alkaline solutions, should be resilient so as to be immune to both thermal and vibrational shock, should possess a low permeability to oxygen, and should, of course, provide a firm and permanent seal for the terminals.

Many battery applications employ cells with compression type seals in which a resilient material, such as rubber, is compressed and deformed so as to effect the sealing arrangement. However, the loss of resilience, or what is known as "compressive set," of such a compression type seal will limit the service life of such cells. Also, such a compressed seal ordinarily has a relatively high leak or outgassing rate. Thus this type seal is not adequate for applications in which the energy source must be reliable over extended periods of time.

Many present day aerospace batteries utilize non-compression type seals. Among these are ceramic-to-metal seals and epoxy-to-metal seals. Such seals have low leak rates or outgassing of oxygen; however, the joint between the ceramic insulating material and the metallic surfaces in a ceramic-to-metal seal is susceptible to electrochemical corrosion after a relatively short period of service. Also an epoxy-to-metal seal is usually "potted," and this technique introduces significant weight problems which may be prohibitory in satellite or other low weight requirement applications.

Therefore, it is the object of this invention to provide an improved bonded elastomer-to-metal seal for electrochemical cells which is leak resistant.

It is yet a further object of this invention to provide a novel cell lid configuration for a secondary cell that utilizes an elastomer-to-metal seal.

The foregoing and other objects of this invention are achieved by bonding an elastomeric sealant to both an electrical terminal and a metallic surface of an electrochemical cell which contains an alkaline electrolyte. The above objects are further achieved by the use of a novel cell lid configuration in which a portion of a metallic cell lid is folded back and away from an aperture within the cell lid, so as to provide a longer metallic path between weld points on the outer periphery of the cell lid and an elastomeric sealant which is positioned within the aperture.

Other objects as well as the advantages and features of the present invention will, of course, become apparent and immediately suggest themselves to those skilled in the art to which the invention is directed from a reading of the following detailed description in connection with the accompanying drawings in which.

Figure 1:
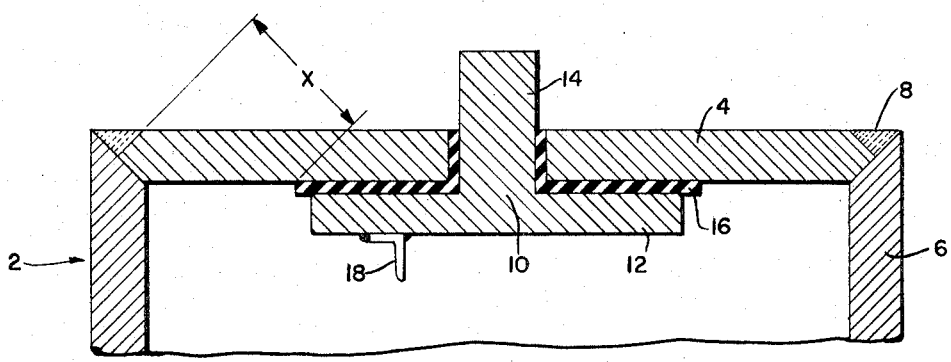
FIGURE 1 is a partial side view of the elastomer-to-metal seal configuration of this invention.

Referring now to the drawings in more detail, FIGURE 1 is a cut away side view of a secondary cell or electrochemical storage battery which illustrates the seal-to-terminal configuration. A cell 2, which in a specific embodiment is a nickel-cadmium cell, includes a metallic can 6 and a metallic cell lid 4 which has an aperture at its center. The cell lid 4 may be joined to can 6 to form a cell case by a conventional welding process at weld points 8. The welding process insures the necessary leak proof junction between the cell lid 4 and the can 6 of the electrochemical cell 2. In a particular embodiment, can 6 is a cylindrical configuration and is such that the disc-like metallic cell lid 4 is circular.

The cell 2 includes an electrical terminal 10 consisting of base or flange 12 and a lug 14 which extends perpendicularly from the base 12. As may be seen in FIGURE 1, a sectional view of this terminal 10 essentially represents an inverted T. The lug 14 of the terminal 10 is positioned so as to extend completely through the aperture within the metallic cell lid 4. It is noted that lug 14 does not fit flush against the periphery of the aperture within cell lid 4, but rather is of a smaller diameter than the aperture diameter so as to allow for the insertion of an insulating elastomeric sealant 16. The disc-like base 12 of the terminal 10 may be of the same configuration as is cell lid 4, i.e., circular, although other configuration such as rectangular are obvious. In a particular embodiment, the diameter of the aperture is ⅛" and the diameter of lug 14 is 1/16". In such a case, elastomeric sealant 16 is 1/20" thick. The terminal 10 is connected to an electrode tab 18 which in turn connects to a positive electrode (not shown) within the electrochemical cell 2. In such a case, the terminal 10 is the positive terminal of the cell.

The elastomeric sealant 16 is bonded to both the metallic cell lid 4 and the electrical terminal 10 so as to completely insulate the terminal 10 from the cell lid 4 (which, in a specific embodiment, may be the negative terminal of the cell). Preferably the elastomeric sealant 16 is a polychloroprene rubber (neoprene) which is substantially free of staining stabilizers, elemental sulphur, thiuram disulfide or other compounds capable of decomposing to yield free sulphur. Also the elastomeric sealant 16 is to be positioned with respect to the metallic terminal 10 and the metallic cell lid 4 so as to electrically insulate all portions of the terminal 10 from the surface of the metallic cell lid 4.

Figure 2:
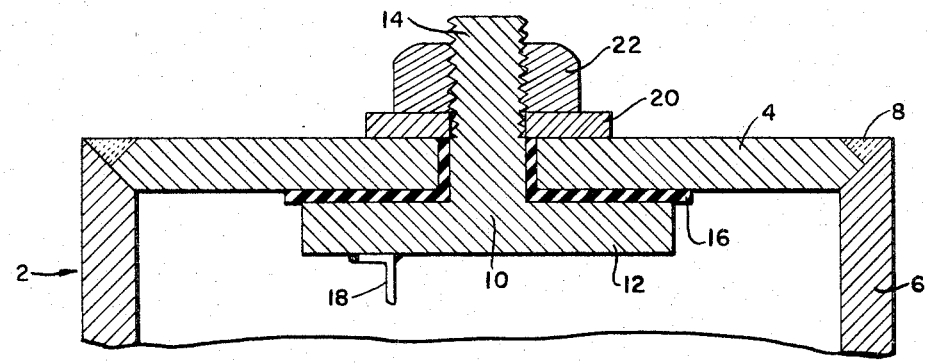
FIGURE 2 is an alternate embodiment of the seal configuration of the invention.

Turning now to FIGURE 2, an insulating washer 20 and threaded nut 22, which are to be positioned around the lug 14 outside of the cell 2, are shown. The insulating washer 20 acts as a diffusion barrier. Further, the inclusion of threads on lug 14 allows for mechanical connection of an electrical lead to the terminal 10 of the cell 2. This alleviates the necessity of a soldered connection to the lug 14 which might cause thermal deterioration of the elastomeric sealant 16 during soldering.

Figure 3:
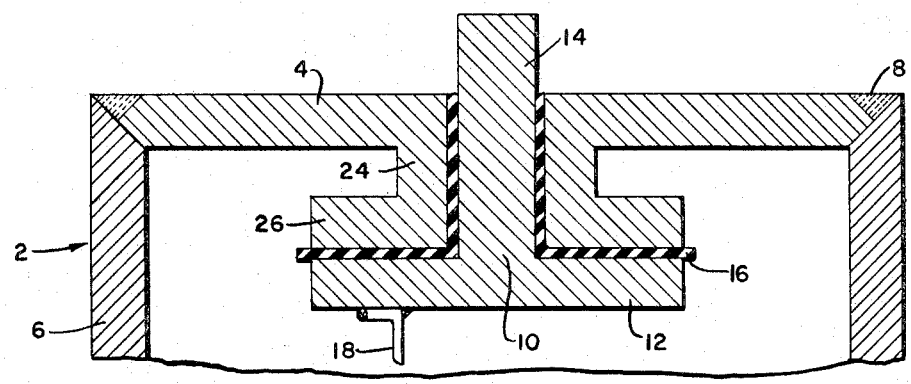
FIGURE 3 is a side view of an alternate configuration to the cell lid of this invention.

FIGURE 3 is a side view representation of a modification of the elastomer-to-metal seal shown in FIGURE 1 in which a novel configuration of the cell lid 4 provides for an increased metallic path from weld point 8 to elastomeric sealant 16. As may be seen in FIGURE 3, the terminal 10 is also of an inverted T configuration. However, cell lid 4 is modified so as to include a downward extension or lip 24 which as at approximately a 90° angle from the plane of the cell lid 4, and a backward extending lip 26. The backward extending lip 26 is within a plane which is at approximately a 90° angle from the downward lip 24 and thus is within a plane approximately parallel to the plane of the cell lid 4. Various other configurations for the cell and lip arrangement (such as a U or V shape) are obvious and the resulting configuration is not limited to an arrangement in which the lips are at 90° angles. Since the welding process at weld 8 generates intense heat, it is possible that the portion of the sealant 16 which insulates cell lid 4 from the terminal 10 may be subject to thermal degradation by the proximity of the welding process. (For example, in FIGURE 1 the length of the path from the sealant to weld point is only equal to a distance X.) The configuration of the cell lid 4 as shown in FIGURE 3 minimizes any adverse thermal effects on that portion of the sealant 16 which insulates cell lid 4 from the terminal 10 by maximizing the path between weld 8 and the elastomeric sealant 16. Such an increased metallic path is particularly desirable in cells which have a very short distance from the weld to the electrical terminal, as, for example, in a prismatic electrochemical cell in which the distance may be less than ¼".

In the specific embodiment shown in the drawings, terminal 10 is the positive terminal of the electrochemical cell and the cell lid 4 is the negative terminal. However, in situations in which both a positive metallic terminal and a negative metallic terminal extend through openings within the metallic cell lid (for example, in cells having an auxiliary electrode) the elastomeric sealant may be used to insulate both the positive terminal from the cell lid and the negative terminal from the cell lid.

As stated above, the elastomeric sealant 16, in a specific embodiment is neoprene, since this material is highly resistant to strongly alkaline solutions and is relatively insusceptible to oxygen outgassing. However, other materials which possess the above qualities and which are capable of being bonded to metallic terminals may be used. A nonvolatile antioxidant such as symmetrical dibetanaphthyl-para-phenyl-enediamine may be added to the neoprene, along with alkali resistant carbon black to increase the resistivity to the permeation of gases.

Turning now to the particulars of the bonding technique which is used to join the elastomeric sealant 16 to both cell lid 4 and the terminal 10, first the two surfaces (the metallic cell lid and the metallic electrical terminal) are chemically degreased, or lightly and uniformly sand blasted or both. To insure an effective bond between the elastomeric sealant 16 and these surfaces, it is necessary to use a primer or tie cement which is to be carefully applied to the surfaces prior to the introduction of an unvulcanized neoprene slug. (Prior to the application of the primer cement, the freshly cleaned metallic surfaces may be treated with a chromatic conversion process, through, for instance, the use of Alodine or Iridite.) Various primer cements may be used. Among these are chlorinated rubber primers, phenolic based primers, isocyanate primers, or epoxy primers. It is noted that should the primer cement contain a solvent, that solvent should be dissipated before insertion of the unvulcanized neoprene.

The uncured neoprene gumstock next is positioned between the metallic surfaces and within an appropriately designed mold. The curing process should take place under pressure or by what is known as "pressure curing." Since substantial pressure is to be applied, it is possible that as the neoprene slug fills out the mold some of the tie or primer cement will be rubbed off the metallic surfaces. In order to minimize such abrading away as the neoprene slug "flows" to fill out the mold, a predetermined amount of neoprene, which is to be properly positioned with respect to the metallic surfaces within the mold, may be utilized.

The actual curing may conveniently be done at temperatures between 300°–370° F. with the length of the molding cycle being predicated upon the amount of time which yields the maximum bond strength. In such a case, the curing time is dependent upon the type of sealant and primer cements which are used. When the molding cycle has been completed, the molded elastomer-to-metal seal may be placed in water so as to cool.

An added problem in removing the molded seal from the mold is encountered if a mold lubricant is not used. For this reason, the mold may be pre-tested with a silicone compound which is allowed to bake into the mold for about 24 hours so as to "condition" the mold to facilitate removal of the bonded elastomer-to-metal seal. If this is done, difficulties in removing the molded item from the mold are minimized.

The advantages of this invention are numerous and the seal is especially adapted for use with secondary cells which require a long service life. The seal is light weight, alkaline resistant, shock and thermal resilient, and in addition may be used with other components (such as electrical condensers) which require a leak proof and effective seal between various metallic surfaces.

It is to be understood that the foregoing disclosure relates to a preferred embodiment of the invention and numerous modifications can be made without departing from the spirit and scope of the invention as defined in the appended claims.

What is claimed is:

1. A bonded elastomer-to-metal insulating seal for an electrochemical cell having an alkaline electrolyte, the cell including an electrical terminal and a metallic surface having an aperture therein, said terminal being positioned within the aperture of said metallic surface; said insulating seal comprising an elastomeric sealing material positioned within said aperture and between said electrical terminal and said metallic surface, said sealing material being bonded to both said electrical terminal and said metallic surface whereby said electrical terminal and said metallic surface are insulated, both physically and electrically, from each other.

2. A bonded elastomer-to-metal insulating seal for an electrochemical cell having an alkaline electrolyte, the cell including a disc-like metallic terminal having a lug extending perpendicularly from its center, and a disc-like metallic surface having an aperture therein at its center, said lug of said terminal being positioned so as to extend through said aperture; said seal comprising an elastomeric sealing material which is resistant to alkaline solutions positioned so as to insulate said terminal including said lug completely from said metallic surface, said sealing material being bonded to both said terminal and said metallic surface whereby an electrically insulated and alkaline resistant seal is formed.

3. A bonded seal as described in claim 1 wherein said elastomeric sealing material is neoprene and said metallic surface is the cell lid of the electrochemical cell.

4. A bonded seal as described in claim 3 wherein said electrical terminal is the positive terminal of the cell and said lid is the negative terminal of the cell.

5. A cell lid for a secondary cell comprising: a generally circular metallic disc having an aperture therein at its center, the lip of said disc at said aperture first extending downward from said aperture within a plane which is at approximately a 90° angle from the plane of said disc and then away from said aperture within a plane approximately parallel to the plane of said disc and at approximately a 90° angle from the plane of said downwardly extending lip, a layer of insulating sealing material completely covering and bonded to the inner surface of the lip, a metallic terminal having a base and an upwardly extending lug, said lug having a lesser cross-sectional area than said aperture and being positioned within and extending through said aperture, said terminal being bonded to said sealing material which everywhere insulates said terminal from said disc.

References Cited

UNITED STATES PATENTS

| | | | |
|---|---|---|---|
| 1,827,112 | 10/1931 | Rudiger | 136—133 X |
| 2,892,006 | 6/1959 | Belove | 136—168 |
| 3,005,865 | 10/1961 | Jonsson | 136—168 X |
| 3,117,033 | 1/1964 | Bachmann | 136—6 |
| 3,294,591 | 12/1966 | Jordan | 136—133 |

WINSTON A. DOUGLAS, *Primary Examiner.*

ALLEN B. CURTIS, *Examiner.*

D. L. WALTON, *Assistant Examiner.*